(12) United States Patent
Reeves et al.

(10) Patent No.: US 7,953,870 B1
(45) Date of Patent: May 31, 2011

(54) DYNAMIC HTTP SERVICE TIMEOUT ADJUSTMENT

(75) Inventors: Raymond Emilio Reeves, Olathe, KS (US); Prabhat Karki, Olathe, KS (US); Sailesh Lamsal, Olathe, KS (US); Ryan Alan Wick, Apollo Beach, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 12/634,063

(22) Filed: Dec. 9, 2009

(51) Int. Cl.
*G06F 15/16* (2006.01)

(52) U.S. Cl. ......... 709/228; 709/227; 709/224; 709/223

(58) Field of Classification Search ............... 709/223, 709/224, 220, 221, 222, 227, 228; 713/502; 718/107; 455/412.1; 715/709
See application file for complete search history.

(56) References Cited

U.S. PATENT DOCUMENTS

| | | | |
|---|---|---|---|
| 2003/0084161 A1* | 5/2003 | Watson et al. | 709/227 |
| 2003/0088677 A1* | 5/2003 | Yamamoto | 709/227 |
| 2005/0102393 A1* | 5/2005 | Murray et al. | 709/224 |
| 2005/0240665 A1* | 10/2005 | Gu et al. | 709/220 |
| 2006/0080410 A1* | 4/2006 | Maclarty et al. | 709/220 |
| 2006/0184661 A1* | 8/2006 | Weisman et al. | 709/224 |
| 2007/0074062 A1* | 3/2007 | Chang et al. | 713/502 |
| 2007/0083813 A1* | 4/2007 | Lui et al. | 715/709 |
| 2008/0104259 A1* | 5/2008 | LeFevre et al. | 709/228 |
| 2008/0288607 A1* | 11/2008 | Muchow | 709/209 |
| 2010/0056109 A1* | 3/2010 | Wilson et al. | 455/412.1 |
| 2010/0211959 A1* | 8/2010 | Chan et al. | 718/107 |

* cited by examiner

*Primary Examiner* — Le Luu

(57) ABSTRACT

Media and system are provided for monitoring and adjusting timeout parameters in devices to prevent or reduce timeout scenarios for the devices. A dynamic timeout management server (DTMS) monitors wait times and behaviors of devices to implement an optimum timeout parameter that will prevent the occurrence of a timeout. When timeouts occur for a particular device, the DTMS changes the amount of time in the timeout parameter and communicates this new timeout parameter to relevant devices to prevent a timeout. The timeout parameter or new timeout parameter is stored in a global centralized timeout database as well as a local or regional timeout database.

12 Claims, 3 Drawing Sheets

DYNAMIC HTTP SERVICE TIMEOUT ADJUSTMENT

BACKGROUND

Currently, HTTP communications between client applications in devices and servers include time limits for the client applications in the devices to respond or provide data. When the devices do not respond with the designated time limits, a timeout occurs which may result in the servers deciding to close or reset the connection with the devices. Typically, servers have a pre-configured, static timeout setting for any HTTP communication with any device. However, not all applications, content documents, terminals, or networks experience the same responsiveness, meaning that many of the applications or devices may exceed the static timeout setting when a response is due. This situation will result in the many of the applications or devices being disconnected and may result in multiple retry sessions between the application or device and the server. As a result, there is no viable means to control or notify the server that the application or device requires a longer wait time.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In a first aspect, media includes computer-useable instructions that are executed in a method for adjusting timeout parameters to enable communications between devices. In the method, a dynamic timeout management server monitors amounts of time for a gateway server to exchange information with devices. A centralized timeout database stores the amounts of time it takes for each of the devices to communicate with the gateway server. The dynamic timeout management server obtains a timeout parameter for each of the devices from the gateway server. The timeout parameter is an amount of time the gateway server waits for a response from a device. The dynamic timeout management sever receives an indication from the gateway server that the amount of time from the response from the device has reached a value of the timeout parameter. The gateway server terminates the communication with the device. The amount of time in the timeout parameter associated with the device is adjusted to be a new timeout parameter to prevent a timeout. The new timeout parameter is stored in place of the timeout parameter in the centralized timeout database. The new timeout parameter is associated with the device. The gateway server is instructed to use the new timeout parameter in place of the timeout parameter for the device.

In a second aspect, a system for preventing an occurrence of timeouts during a communication between devices in a network is provided that includes a gateway server, a dynamic timeout management server, and a centralized timeout database. The gateway server enforces timeouts when devices exceed an amount of time for a timeout parameter, enforces a unique timeout for each device wherein each device has its own timeout parameter, receives instructions from the dynamic timeout management server to adjust the timeout parameter to a new timeout parameter for each device, and provides statistical information to the dynamic timeout management server on the amount of time it takes for each device to communicate. The dynamic timeout management server monitors the amount of time it takes for each device to communicate with the gateway server, adjusts the timeout parameter to the new timeout parameter when the device exceeds the amount of time to communicate, and stores the timeout parameter and the new timeout parameter in a centralized timeout database. The centralized timeout database connects to the dynamic timeout management server and stores timeout information for devices that communicate with or connect to gateway servers. The gateway server is a member of the gateway servers.

In a third aspect, another media includes computer-useable instructions that are executed in a method for adjusting timeout parameters to enable communications between devices. In the method, a gateway server provides amounts of time for the gateway server to exchange information with devices to a dynamic timeout management server. The amounts of time are times it takes for each of the devices to communicate with the gateway server. The amounts of time are stored in a centralized timeout database connected to the dynamic timeout management server. A timeout parameter is provided for each of the devices to the dynamic timeout management server. The timeout parameter is an amount of time the gateway server waits for a response from a device. The timeout parameter is stored for each of the devices in the centralized timeout database. A determination is made when the timeout parameter is reached where the gateway server terminates the communication with the device. The communication is terminated with the device when the amount of time reaches a value of the timeout parameter. A new timeout parameter is received from the dynamic timeout management server to replace the timeout parameter for the device where the new timeout parameter represents the amount of time that has been adjusted in the timeout parameter to prevent a timeout. The new timeout parameter is stored in place of the timeout parameter in a locally managed database connected to the gateway server. The new timeout parameter is associated with the device. The gateway server implements the new timeout parameter in place of the timeout parameter for the device.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
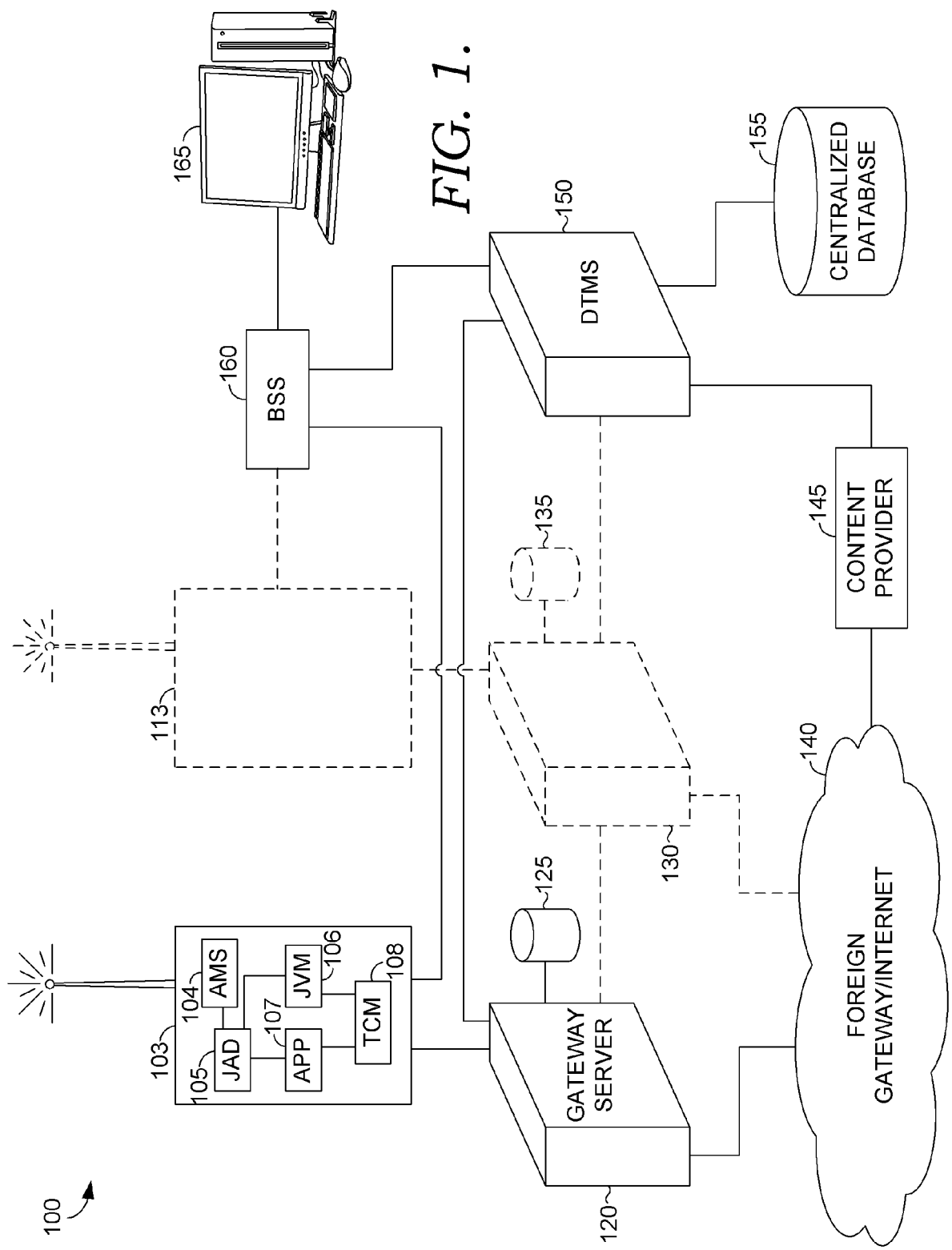
FIG. 1 illustrates a block diagram of an exemplary network for dynamically adjusting timeout values of devices implemented in accordance with an embodiment of the present invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| AAA | Authentication, Authorization, and Accounting |
| AMS | Application Management System |
| APP | Application |
| AT | Access Terminal |
| AUD | Authentication User Delegate |
| BSS | Business Supporting Systems |
| CD-ROM | Compact Disc—Read-Only Memory |
| EEPROM | Electronically Erasable Programmable Read-Only Memory |
| IP | Internet Protocol |
| J2ME | Java 2 Micro Edition |
| JAD | Java Application Description |
| JAD | Java Decompiler |
| JVM | Java Virtual Machine |
| MIP | Mobile Internet Protocol |
| NAS | Network Access Server |
| RAM | Random Access Memory |
| ROM | Read-Only Memory |
| TCM | Telecommunication Management |
| TOdb | Timeout Database |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

U.S. application Ser. No. 12/613,815, which was filed on Nov. 5, 2009 is herein incorporated by reference.

Dynamic Timeout Management Server

Implementations of embodiments of the present invention introduce a new set of protocol directives for the HTTP Expect request header for proxy/server control. For example, http.proxy.timeout is used to indicate the timeout behavior for proxy gateways; http.timeout is used to indicate the timeout behavior for all servers involved in satisfying the particular HTTP session on an end-to-end basis; http.proxy.global.timeout is used to indicate the default timeout to be used by servers attending requests from the issuing clients. Implementations of embodiments of the present invention also introduce qualifying application protocol expectations for the http.proxy.global.timeout directive to control the extent of timeout behavior with a user agent, which would be used by an application to modify the server/proxy timeout behavior when serving a specific user agent; a terminal identifier, controlling server/proxy timeout logic when serving specific terminals; a user identifier, allowing control over server/proxy timeouts when serving a specific user; a content type, extending server/proxy timeout control into specific content types; and a location, which sets specific timeouts at the server/proxy for content located in specified hosts and/or paths. Implementations of embodiments of the present invention further defines Java Application Description (JAD) attributes that would force HTTP stacks for connections for a particular J2ME application to be qualified as instructed. The application management system (AMS) would verify that the J2ME application is authorized to use the new directives, and upon detecting launch of the application, convey session or global changes needed to meet the application's agreement. Implementations of embodiments of the present invention yet further creates a dynamic timeout management server (DTMS), which is trusted by proxy servers. Proxy servers also delegate responsibility to the DTMS to verify whether timeout modification directives are authorized. The DTMS is responsible for dynamically determining whether timeout adjustments must be performed based on recent system performance and behavior. Implementations of embodiments of the present invention finally modify compliant servers and proxies to have timeout databases (TOdb) replicated from a designated centralized timeout database connected to the DTMS. The servers' and proxies' timeout databases are locally-managed or regionally-managed timeout databases as opposed to the centralized timeout database, which is global timeout database. The servers and proxies, along with their respective locally-managed timeout databases, enforce multiple timeout settings to accommodate user agents, terminal identifiers, user identifiers, content types, and locations at a global or session level. The locally-managed or regionally-managed timeout databases are controlled through replication of requests into the DTMS, which may exemplary look as follows:

Expect.http.proxy.timeout=3000
Expect.http.timeout=15000
Expectproxy.global.timeout=10000
Expect.proxy.global.timeout=10000;user-agent="Samsung-SPHA920 AU-MIC/2.0 MMP/2.0*"
Expect.proxy.global.timeout=10000;location=http://vod.sprint.com/rentalmovies/fulldownloads/*"
Expect.proxy.global.timeout=10000;user-agent="Samsung-SPHA920 AU-MIC/2.0 MMP/2.0 VideoPlayer/1.0 UNTRUSTED/1.0";location=http://video.lackluster.com/*"

One key value of the DTMS is that it operates in the call flow of HTTP communications into and out of proxy/servers. The DTMS determines conditions where timeouts cross preset thresholds and automatically instruct the proxy/server to change its behavior either by increasing times or decreasing times at the occurrence of an event. The DTMS is also responsible for stripping from HTTP requests new directives that are defined herein should the DTMS determine that a proxy/server does not support certain features.

To further describe the various aspects of the present invention, several figures shall be discussed in detail to provide a more detailed understanding of the present invention.

In FIG. 1, an exemplary network 100 for dynamically adjusting timeout values is shown with mobile devices 103 and 113, servers 120 and 130, timeout databases 125 and 135, Internet 140, a content provider 145, a DTMS 150, a centralized timeout database 155, business supporting systems (BSS) 160, and a computer 165. Network 100 provides exemplary components to adjust timeout values for mobile devices 103 and 113, and content provider 145.

Continuing with FIG. 1, mobile device 103 can include an AMS 104, JAD 105, JVM 106, APP 107, and TCM 108. AMS 104 allows mobile device 103 to support an AUD-mode service. JAD 105 provides a decompiler for the Java programming language. JVM 106 provides a Java Virtual Machine that enables the execution of other computer programs, applications, or scripts in mobile device 103. APP 107 represents a number of applications located on mobile device 103. TCM 103 identifies the telecommunications or telephone aspects of mobile device 103. It is noted that mobile device 113 has the same components as mobile device 103. Thus, the internals of mobile device 113 are not repeated and discussed again.

Mobile device 103 attempts to access web content from content provider 145. Mobile device 103 connects to gateway server 120, which connects through the Internet 140 to content provider 145. Gateway server 120 keeps track of the amount of time for mobile device 103 and content provider 120 to respond to each other. The amounts of time expected for mobile device 103 and content provider 120 to respond are kept in respective time parameters which are stored in locally-managed or regionally-managed timeout database 125 connected to gateway server 120. Similarly situated, mobile device 113 connects to gateway server 130, which is connected to timeout database 135.

If mobile device 103 or content provider 145 exceeds its timeout parameter by not responding in the appropriate time, the timeout parameter can be dynamically changed by the DTMS 150. DTMS 150 connects to gateway servers 120 and 130. The DTMS 150 monitors the responses transmitted through gateway servers 120 and 130. Over time, DTMS 150 can establish a behavior or baseline for the value of timeout parameters for mobile device 103 and content provider 145. If the response time is exceeded over a period of time, DTMS 150 can modify the amount of time for a device to respond in its timeout parameter to a new value, minimizing the change for reaching the timeout value.

The DTMS 150 works to increase and decrease timeout values in timeout parameters by monitoring the behavior of devices such as mobile device 103 and content provider 145. For example, mobile device 103 may send a request for web content from content provider 145. Content provider 145 may respond in a faster time than normal. Upon monitoring this behavior through gateway server 120, DTMS 150 may decrease the amount of time in the timeout parameter for content provider 145. On the contrary, congestion may exist in the network causing content provider 145 to take more time than normal to respond to mobile device 103. As a result, timeouts for content provider 145 may occur more frequently causing gateway server 120 to cut off communications with content provider 145 when the timeout parameter is reached. As DTMS 150 monitors the situation, DTMS 150 may increase the amount of time that gateway server 120 waits for content provider 145 to respond. This new timeout parameter is stored in centralized timeout database 155. This new timeout parameter is also replicated in timeout database 125, but not replicated in timeout database 135. Centralized timeout database 155 is a global database for all information while timeout database 125 is a locally-managed or regionally-managed database.

The efforts of DTMS 150 to dynamically change timeout parameters ensure an efficient operation of devices in their communications with each other. Timeouts of devices are reduced over time since DTMS 150 monitors the retry attempts as well as the timeout that occurs. Regular maintenance or servicing of DTMS 150 may occur through BSS 160. DTMS 150 has a connection to BSS 160 for various business services that may require access to it. BSS 160 can be manipulated or accessed by a user operating computer 165.

Figure 2:
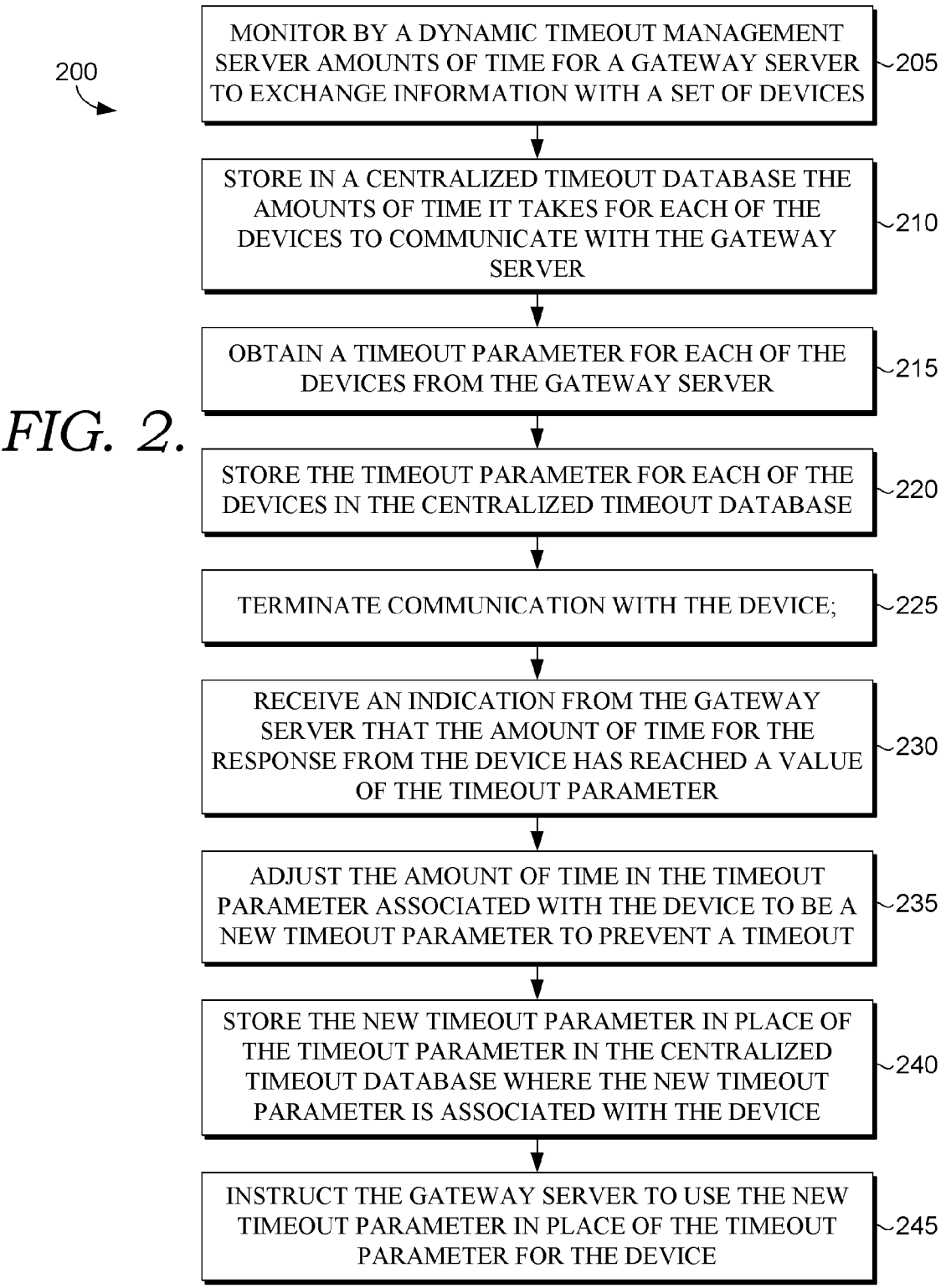
FIG. 2 illustrates a process for adjusting timeout parameters to enable communication between devices implemented in accordance with an embodiment of the present invention.

Turning now to FIG. 2, a process for adjusting timeout parameters to enable communication between devices is shown in a method 200. In a step 205, DTMS 150 monitors amounts of time for gateway server 120 to exchange information between a set of devices such as mobile devices 103 and 113, and content provider 145. In a step 210, the amounts of time it takes for mobile device 103, mobile device 113, and content provider 145 to communicate with gateway servers 120 and 130 are stored in centralized timeout database 155. In a step 215, a timeout parameter is obtained for each of the devices from gateway servers 120 and 130. Each of the devices includes mobile device 103, mobile device 113, and content provider 145. The timeout parameter for each of the devices is stored in centralized timeout database 155 in a step 220. It is noted that although centralized timeout database 155 stores the amounts of time and timeout parameters for mobile device 103, mobile device 113, and content provider 145 on a global basis, timeout database 125 stores amounts of time and timeout parameters on a local or regional basis for mobile device 103 and content provider 145. Timeout database 135 stores amounts of time and timeout parameters on a local or regional basis for mobile 113 and content provider 145.

If a device (mobile device 103) exceeds its wait time defined in the timeout parameter, in a step 225, communication is terminated with the device. In a step 230, an indication is received from gateway server 120 that the amount of time for the response from mobile device 103 has reached a value of the timeout parameter. At this point, mobile device 103 may make several attempts to connect to content provider 145 through gateway server 120. Upon each attempt, the communication will be terminated if the value in the timeout parameter is exceeded.

While mobile device 103 attempts to connect to content provider 145, DTMS 150 monitors the behavior and interactions of mobile device 103. In a step 235, DTMS 150 adjusts the amount of time in the timeout parameter associated with mobile device 103 to a new timeout parameter to prevent a timeout. Depending on the circumstances, DTMS 150 can make incremental increases in the new timeout parameter until a successful connection is made by mobile device 103, preventing a timeout. In a step 240, the new timeout parameter is stored in centralized timeout database 155 in place of the original or previous timeout parameter. The new timeout parameter is associated with mobile device 103. In a step 245, DTMS 150 instructs gateway server 120 to use the new timeout parameter in place of the original or previous timeout parameter for mobile device 103.

Although not discussed, DTMS 150 interacts with gateway server 130 to monitor and manage a timeout parameter for mobile device 113. DTMS 150 may interact with both gateway servers 120 and 130 to monitor and manage a timeout parameter for content provider 145. Depending on an implementation of an embodiment of the present invention, one timeout parameter may exist for content provider 145 that is stored in centralized timeout database 155, which can be monitored by DTMS 150 at both gateway servers 120 and 130. Or, two timeout parameters can exist for content provider 145 with both being stored in centralized timeout database 155. One timeout parameter can exist for communications that occur through gateway server 120 and another timeout parameter can exist for communications that occur through gateway server 130. The idea here is to note that communications through different parts of the network may evoke different responses. Therefore, a successful communication by content provider through one part of the network may give rise to an entirely different response when the communication is made through an entirely different part of the network. For example, congestion may appear at some point of the communication with gateway server 130 that does not exist with communications with gateway server 120. Therefore, an implementer may desire to have multiple timeout parameters for the same device (content provider 145) to address each communication situation.

As the discussion has focused on changing timeout parameters when a timeout occurs, a timeout parameter can be changed for a device when the amount of time is more than sufficient in the timeout parameter. For example, mobile device 103 may have a timeout parameter that is defined as twenty (20) milliseconds for a response. DTMS 150 may determine that it only takes mobile device 103 five (5) milliseconds or less to respond. As a result, DTMS 150 may lower the value in the timeout parameter to a new value of eight (8) milliseconds. This new value can be stored as a new timeout parameter in centralized timeout database 155. DTMS 150 will instruct gateway server 120 to use the new timeout parameter for mobile device 103. The new timeout parameter is also stored timeout database 125.

Figure 3:
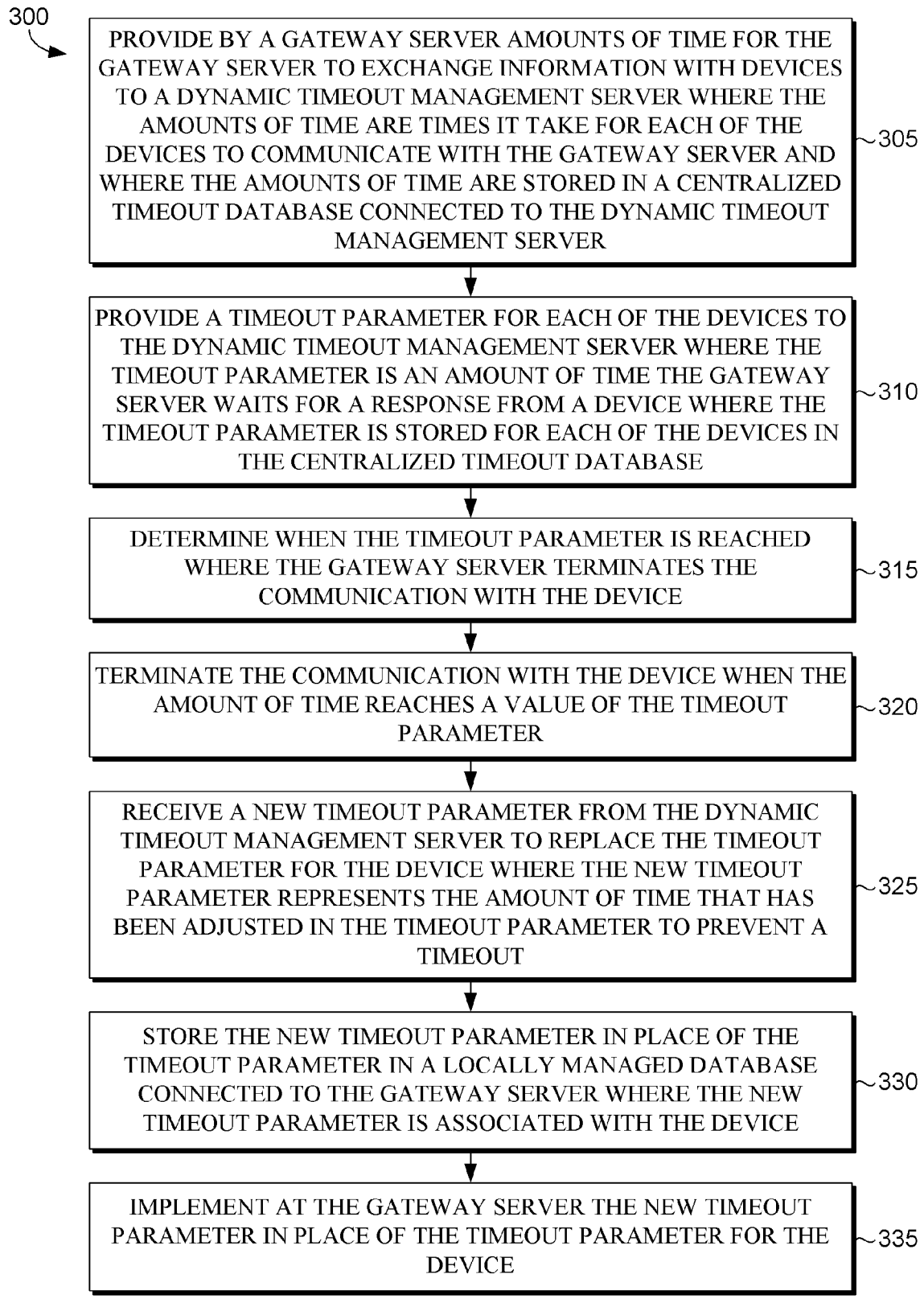
FIG. 3 illustrates a process preventing an occurrence of timeouts during a communication between devices in a network implemented in accordance with an embodiment of the present invention.

Turning now to FIG. 3, a process for preventing an occurrence of timeouts during a communication between devices in a network is provided in a method 300. In a step 300, gateway server 120 provides amounts of time for gateway server 120 to exchange information between mobile device 103 and content provider 145. The amounts of time are provided to DTMS 150. The amounts of time are times it take for mobile device 103 and content provider 145 to communicate with each other through gateway server 120. The amounts of time are collected by DTMS 150 and stored in centralized timeout database 155.

In a step 310, gateway server 120 provides a timeout parameter for mobile device 103 and content provider 145 to DTMS 150. The timeout parameter for each device is an amount of time gateway server 120 waits for a response from mobile device 103 or content provider 145. The timeout parameters are stored for each device in centralized timeout database 155.

While DTMS 150 is monitoring the behavior of devices at gateway server 120, in a step 315, gateway server 120 determines when a timeout parameter for a device is reached. When the timeout parameter is reached, gateway server 120 terminates communication with the device. More particularly in a step 320, communication with the device is terminated when the amount of time reaches a value of the timeout parameter.

In a step 325, a new timeout parameter is received from DTMS 150 to replace the original or previous timeout parameter for the device. The new timeout parameter represents the amount of time that has been adjusted in the timeout parameter to prevent a timeout. In a step 330, the new timeout parameter is stored in place of the timeout parameter in a locally-managed or regionally-managed timeout database 125 connected to gateway server 120. The new timeout parameter is associated with the device. In a step 335, gateway server 120 implements the new timeout parameter in place of the original or previous timeout parameter for the device.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure. Further, alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more computer-readable storage media having computer-useable instructions embodied thereon, wherein all steps are performed by a computer, for executing a method for adjusting timeout parameters to enable communications between devices, comprising:

monitoring by a dynamic timeout management server amounts of time for a gateway server to exchange information with a set of devices;

storing in a centralized timeout database the amounts of time it takes for each of the set of devices to communicate with the gateway server;

obtaining a timeout parameter for each of the set of devices from the gateway server wherein the timeout parameter is an amount of time the gateway server waits for a response from a device;

storing the timeout parameter for each of the set of devices in the centralized timeout database;

receiving an indication from the gateway server that the amount of time for the response from the device has reached a value of the timeout parameter wherein the gateway server terminates the communication with the device;

adjusting the amount of time in the timeout parameter associated with the device to be a new timeout parameter to prevent a timeout;

storing the new timeout parameter In place of the timeout parameter in the centralized timeout database wherein the new timeout parameter is associated with the device; and instructing the gateway server to use the new timeout parameter in place of the timeout parameter for the device.

2. The media of claim 1, wherein the set of devices and the device are selected from a group including a mobile device and a web server.

3. The media of claim 2, further comprising storing the timeout parameter and the new timeout parameter in a locally managed database used by the gateway server.

4. The media of claim 3, further comprising receiving the new timeout parameter at the gateway server from the centralized timeout database through the dynamic timeout management server and storing the new timeout parameter in the locally managed database.

5. The media of claim 4, wherein instructing the gateway server to use the new timeout parameter comprises updating the locally managed database with the new timeout parameter.

6. A system for preventing an occurrence of timeouts during a communication between devices in a network, comprising:

a gateway server that enforces timeouts when devices exceed an amount of time for a timeout parameter, enforces a unique timeout for each device wherein each device has its own timeout parameter, receives instructions from a dynamic timeout management server to adjust the timeout parameter to a new timeout parameter for each device, and provides statistical information to the dynamic timeout management server on the amount of time it takes for each device to communicate;

the dynamic timeout management server that monitors the amount of time it takes for each device to communicate with the gateway server, adjusts the timeout parameter to the new timeout parameter when the each device exceeds the amount of time to communicate, and stores the timeout parameter and the new timeout parameter in a centralized timeout database; and the centralized timeout database that connects to the dynamic timeout management server and stores timeout information for devices that communicate with or connect to one or more gateway servers wherein the gateway server is a member of the one or more gateway servers.

7. The system of claim 6, further comprising a locally managed database that connects to the gateway server and stores locally for each device the timeout parameter and instructions received at the gateway server from the dynamic timeout management server.

8. One or more computer-readable storage media having computer-useable instructions embodied thereon, wherein all steps are performed by a computer, for executing a method for adjusting timeout parameters to enable communications between devices, comprising:

providing by a gateway server amounts of time for the gateway server to exchange information with a set of devices to a dynamic timeout management server wherein the amounts of time are times it take for each of the set of devices to communicate with the gateway server and wherein the amounts of time are stored in a centralized timeout database connected to the dynamic timeout management server;

providing a timeout parameter for each of the set of devices to the dynamic timeout management server wherein the timeout parameter is an amount of time the gateway server waits for a response from a device wherein the timeout parameter is stored for each of the set of devices in the centralized timeout database;

determining when the timeout parameter is reached where the gateway server terminates the communication with the device;

terminating the communication with the device when the amount of time reaches a value of the timeout parameter;

receiving a new timeout parameter from the dynamic timeout management server to replace the timeout parameter for the device where the new timeout parameter represents the amount of time that has been adjusted in the timeout parameter to prevent a timeout;

storing the new timeout parameter in place of the timeout parameter in a locally managed database connected to the gateway server wherein the new timeout parameter is associated with the device; and implementing at the gateway server the new timeout parameter in place of the timeout parameter for the device.

9. The media of claim 8, wherein the set of devices and the device are selected from a group including a mobile device and a web server.

10. The media of claim 9, further comprising storing the timeout parameter and the new timeout parameter in the centralized timeout database that is connected to the dynamic timeout management server.

11. The media of claim 10, further comprising receiving the new timeout parameter at the gateway server from the centralized timeout database through the dynamic timeout management server and storing the new timeout parameter in the locally managed database.

12. The media of claim 11, wherein implementing at the gateway server the new timeout parameter comprises updating the locally managed database with the new timeout parameter.

\* \* \* \* \*